(12) United States Patent
Morikawa et al.

(10) Patent No.: US 9,169,066 B2
(45) Date of Patent: Oct. 27, 2015

(54) ARTICLE STORAGE FACILITY

(75) Inventors: Yasushi Morikawa, Higashiomi (JP); Hideo Yoshioka, Shiga (JP)

(73) Assignee: Daifuku Co., Ltd., Osaka-shi (JP)

( * ) Notice: Subject to any disclaimer, the term of this patent is extended or adjusted under 35 U.S.C. 154(b) by 182 days.

(21) Appl. No.: 13/514,536

(22) PCT Filed: Oct. 22, 2010

(86) PCT No.: PCT/JP2010/068728
§ 371 (c)(1),
(2), (4) Date: Aug. 14, 2012

(87) PCT Pub. No.: WO2011/070862
PCT Pub. Date: Jun. 16, 2011

(65) Prior Publication Data
US 2012/0312634 A1  Dec. 13, 2012

(30) Foreign Application Priority Data
Dec. 10, 2009  (JP) .................. 2009-280658

(51) Int. Cl.
*E04G 1/38* (2006.01)
*E04G 3/28* (2006.01)
*B65G 1/02* (2006.01)
*E06C 1/393* (2006.01)
*E06C 1/397* (2006.01)
(Continued)

(52) U.S. Cl.
CPC . *B65G 1/02* (2013.01); *E06C 1/393* (2013.01); *E06C 1/397* (2013.01); *E06C 9/12* (2013.01); *B65G 1/0407* (2013.01)

(58) Field of Classification Search
CPC ............. E06C 9/12; E06C 1/397; E06C 9/06; E06C 9/08; E06C 9/085
USPC ................ 182/36, 39, 82–86, 93, 95, 97, 115
See application file for complete search history.

(56) References Cited

U.S. PATENT DOCUMENTS 560,752 A * 5/1896 Prator et al. .................. 182/156
652,948 A * 7/1900 Barth ............................ 182/106
701,532 A * 6/1902 Bardin ......................... 182/106

(Continued)

FOREIGN PATENT DOCUMENTS

JP  59102800 U  7/1984
JP  1158191 A  6/1989

(Continued)

*Primary Examiner* — Katherine Mitchell
*Assistant Examiner* — Shiref Mekhaeil
(74) *Attorney, Agent, or Firm* — The Webb Law Firm

(57) ABSTRACT

A work platform on which a worker can ride includes a suspended portion supported above a floor surface, the suspended portion being movable by a movement rail provided upwardly of a movement path, and a platform portion provided in the form of a plate on which the worker can ride, the platform portion having a base end connected to a lower end portion of the suspended portion to be pivotable about an axis along the direction of lateral width of the movement path. With pivotal movements about the axis, the platform portion can selectively assume a riding posture wherein the platform portion extends along the movement path so that the worker riding on this platform portion can move along the longitudinal direction of the movement path and a folded posture wherein the platform portion is folded toward the suspended portion to extend along the vertical direction.

11 Claims, 12 Drawing Sheets

(51) Int. Cl.
*E06C 9/12* (2006.01)
*B65G 1/04* (2006.01)

(56) References Cited

U.S. PATENT DOCUMENTS

| | | | | |
|---|---|---|---|---|
| 826,582 A * | 7/1906 | Laird | | 182/124 |
| 988,593 A * | 4/1911 | Poss | | 182/95 |
| 1,439,388 A * | 12/1922 | Willett | | 182/15 |
| 1,702,249 A * | 2/1929 | Davidson | | 182/125 |
| 2,172,860 A * | 9/1939 | Weaver | | 182/123 |
| 2,369,743 A * | 2/1945 | Langdon | | 182/125 |
| 3,892,290 A * | 7/1975 | Lang | | 182/22 |
| 4,290,502 A * | 9/1981 | Anderson | | 182/33 |
| 4,503,932 A * | 3/1985 | Hilton | | 182/113 |
| 4,733,752 A * | 3/1988 | Sklar | | 182/86 |
| 4,907,673 A * | 3/1990 | Ginter et al. | | 182/81 |
| 5,224,437 A * | 7/1993 | Stanescu | | 114/362 |
| 5,582,268 A * | 12/1996 | Heberlein | | 182/113 |
| 5,743,356 A * | 4/1998 | Mitchell | | 182/214 |
| 5,911,287 A * | 6/1999 | Campbell | | 182/103 |
| 5,924,521 A * | 7/1999 | Crockett | | 182/95 |
| 5,941,343 A * | 8/1999 | Kelsey | | 182/107 |
| 6,951,265 B2 * | 10/2005 | Frame et al. | | 182/152 |
| 7,104,361 B2 * | 9/2006 | Walsh | | 182/156 |
| 7,422,263 B2 * | 9/2008 | Pritchard | | 296/62 |
| 8,136,632 B2 * | 3/2012 | Gabriel | | 182/116 |
| 2007/0267251 A1 * | 11/2007 | Poldmaa | | 182/107 |
| 2011/0247895 A1 * | 10/2011 | Smith | | 182/106 |
| 2013/0068557 A1 * | 3/2013 | Rasmussen | | 182/36 |

FOREIGN PATENT DOCUMENTS

| | | |
|---|---|---|
| JP | 2001151307 A | 6/2001 |
| JP | 2007326686 A | 12/2007 |

* cited by examiner

Fig. 13
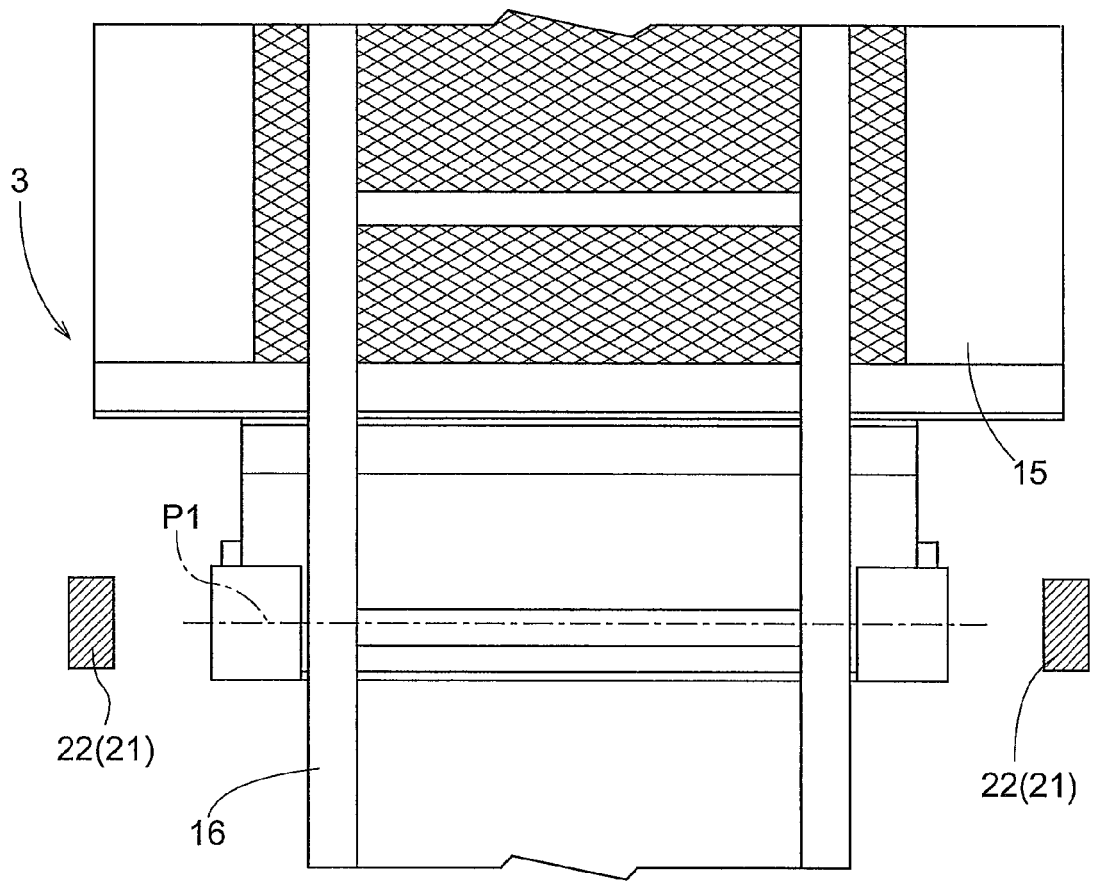
(a)
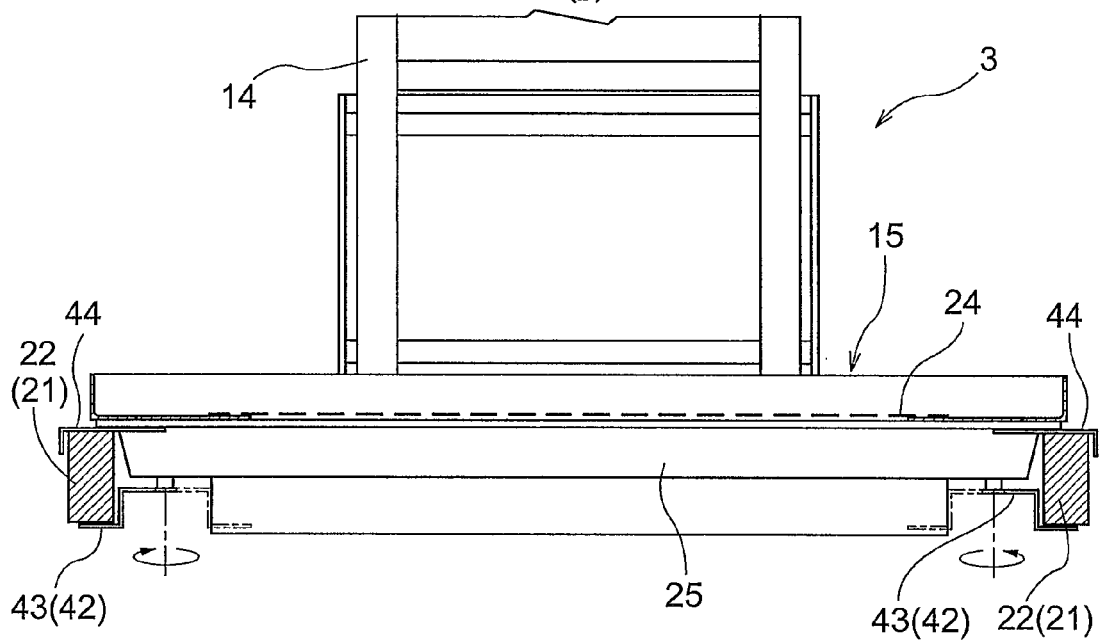
(b)

ARTICLE STORAGE FACILITY

BACKGROUND OF THE INVENTION

1. Field of the Invention

The present invention relates to an article storage facility including a storage shelf having storing sections for storing articles juxtaposed along a vertical direction and a shelf lateral width direction, a stacker crane that travels on a floor surface of a movement path formed forwardly of the storage shelf along the longitudinal direction thereof, and a work platform on which a worker can ride.

2. Description of the Related Art

The article storage facility described above is configured such that articles may be stored in the storage shelf and entrance and retrieval of the articles to/from the storage sections are made possible by the stacker crane. And, in case the site for effecting a work is distant high away from the floor surface at a significant level out of the hand reach of the worker present on the floor surface such as the case of occurrence of collapse of articles stored on the storage shelf or being conveyed by the stacker crane at a position high off the floor surface, conventionally, the work platform was moved to a desired position on the movement path and the worker riding on this work platform would do the required work.

And, conventionally, the work platform was configured as a "ladder" suspended and supported by a movement rail provided upwardly of a movement path to be movable along the longitudinal direction of the movement path, so that a worker can climb up/down from/to the floor surface. And, this work platform has a reduced width along the longitudinal direction of the movement path, so that when the work platform is not used, this work platform may be stored at a terminal end of the movement path without interfering with the traveling of the stacker crane (see e.g. Patent Document 1).

PRIOR ART DOCUMENT

Patent Document 1: Japanese Unexamined Patent Application Publication No. 1-158191

SUMMARY OF THE INVENTION

However, since the conventional work platform was configured as a suspended/supported ladder, the movable area for the worker riding on the ladder in the longitudinal direction of the movement path was limited to the range of the lateral width of this ladder. Moreover, the lateral width of the ladder is reduced so as not to be problematic at the time of its storage. Therefore, the worker can work only within a small area along the longitudinal direction of the movement path. Therefore, when the worker is to effect a work over a wide range along the longitudinal direction of the movement path, the worker needs to move the work platform frequently along the movement path during the work, so that effecting the work was troublesome. Further, as the conventional work platform was configured as a suspended and supported ladder, the worker riding on this ladder would effect a work while holding the ladder. Hence, in this respect too, effecting a work was troublesome.

The present invention has been made in view of the above-described state of the art. Its object is to provide an article storage facility with which its work platform, when stored, will hardly interfere with traveling of the stacker crane and which also allows a work using the work platform to be effected with ease.

An article storage facility relating to the present invention includes: a storage shelf having storing sections for storing articles juxtaposed along a vertical direction and a shelf lateral width direction; a stacker crane that travels on a floor surface of a movement path formed forwardly of the storage shelf along the longitudinal direction thereof; and a work platform on which a worker can ride. According to the first characterizing feature of the present invention:

said work platform includes a suspended portion suspended and supported above the floor surface, the suspended portion being movable by a movement rail provided upwardly of the movement path along the longitudinal direction of the movement path, and a platform portion provided in the form of a plate on which the worker can ride, the platform portion having a base end thereof connected to a lower end portion of the suspended portion to be pivotable about a pivot axis extending along the direction of lateral width of the movement path; and with pivotal movements thereof about the pivot axis, the platform portion can selectively assume a riding posture wherein the platform portion extends along longitudinal direction of the movement path so that the worker riding on this platform portion can move along the longitudinal direction of the movement path and a folded posture wherein the platform portion is folded toward the suspended portion to extend along the vertical direction.

That is, the work platform can be moved to a desired position on the movement path by moving the suspended portion together with the platform portion along the longitudinal direction of the movement path. Further, the posture of the platform portion can be switched over to the riding posture and the folded posture by pivoting this platform portion about the pivot axis.

And, when the platform portion is switched in posture to the folded posture, this platform portion is folded toward the suspended portion to extend along the vertical direction, whereby the work platform now has a reduced width along the longitudinal direction of the movement path. Hence, when the work platform, when not used, is stored at the terminal end of the movement path, this work platform will hardly interfere with traveling of the stacker crane. Also, when the platform portion is switched to the riding posture, this platform portion in the form of a plate extends along the longitudinal direction of the movement path, so that the worker riding on this platform portion can move on this platform along the longitudinal direction of the movement path. As a result, the worker as riding on this platform portion can effect a work over a wide area along the longitudinal direction of the movement path. Hence, a work over a wide area along the longitudinal direction of the movement path is made possible. Accordingly, when a work is to be effected over a wide area along the longitudinal direction of the movement path, there is no need for frequently moving the work platform along the longitudinal direction of the movement path during the work and the work can be effected with ease. Moreover, when the platform portion is switched to the riding posture, the platform portion in the form of a plate assumes the posture extending along the longitudinal direction of the movement path, so the posture of the worker remains stable even if the worker does not hold the platform portion or the suspended portion. Hence, the work is facilitated in this respect as well.

Therefore, it has become possible to provide an article storage facility with which its work platform, when stored, will hardly interfere with traveling of the stacker crane and which also allows a work using the work platform to be effected with ease.

According to the second characterizing feature of the article storage facility relating to the present invention, in the first characterizing feature described above, said work platform includes a stairway portion connected to said platform portion for allowing the worker to climb up/down the stairway portion from/to the floor surface;

said stairway portion is connected and supported to said platform portion with its base end portion pivotable about a second pivot axis extending along a lateral width of said movement path; and with pivotal movements thereof about said second pivot axis, said stairway portion can selectively assume a climbing posture where the stairway portion extends along the vertical direction with the platform portion being switched to said riding posture and a non-climbing posture where the stairway portion is folded toward the platform portion to extend along the vertical direction, with the platform portion being switched to said folded posture.

That is, by pivoting the stairway portion about the second pivot axis, this stairway portion can be switched over in posture between the climbing posture and the non-climbing posture. And, when the stairway portion is switched to the non-climbing posture, the stairway portion assumes the posture extending along the vertical direction with the platform portion being switched to the folded posture, whereby the thickness of the work platform in the longitudinal direction of the movement path is reduced. As a result, when the work platform is stored, this work platform will hardly interfere with traveling of the stacker crane. Further, when the stairway portion is switched to the climbing posture, this stairway portion assumes the posture extending along the vertical direction with the platform portion being switched to the riding posture. Hence, the worker can climb up/down the stairway portion thereby riding on/off the work platform. And, as the stairway portion can be set with only pivoting this stairway portion about the second pivot axis, the setting operation of the work platform can be effected more easily as compared with an arrangement that requires separately providing a stepladder or the like.

According to the third characterizing feature of an article storage facility relating to the present invention, in the first or second characterizing feature described above, said storage shelf includes a support member for receiving and supporting said platform portion under its riding posture.

That is, when the platform portion is switched to the riding posture, this platform portion can be supported by the support member included in the article storage shelf to be maintained under this riding posture. Hence, with this arrangement, the worker as riding on the platform portion can effect a work with even greater ease. Further, since the support member is provided in the article storage shelf, there is no need for separately providing a support deck or the like for supporting the platform portion under its riding posture. And, the platform portion can be set to be received and supported by the support member with simply switching this platform portion to the riding posture. Therefore, the setting operation of the work platform can be readily effected.

According to the fourth characterizing feature of an article storage facility relating to the present invention, in the third characterizing feature described above, the facility includes a pair of said storage shelves disposed on opposed lateral width sides of said movement path; and said support member comprises elongate members provided respectively for the pair of storage shelves, said elongate members being formed elongate along the longitudinal direction of the movement path.

Namely, as the platform portion as being switched to the riding posture has its opposed lateral width portions received and supported by the elongate members along the entirety of this platform portion along the longitudinal direction, it is possible to restrict tilting displacement of the platform portion along the its longitudinal direction and lateral width direction. Therefore, the platform portion can be maintained under the riding posture in a stable manner.

According to the fifth characterizing feature of an article storage facility relating to the present invention, in the third or fourth characterizing feature described above, said platform portion includes a pivot restricting member for restricting the upward pivotal movement of said platform portion, said pivot restricting member being switchable in position between a pivot restricting position where said pivot restricting member is located downwardly of said support member with said platform portion being switched to the riding posture, thereby to restrict a pivotal movement of said platform portion from said riding posture to said folded posture and a pivot allowing position where said pivot restricting member is retracted away from the position downwardly of the support member with said platform portion being switched to said riding posture, thereby to allow the pivotal movement of said platform portion from said riding posture to said folded posture.

That is, when the pivot restricting member is switched to the pivot allowing position, this pivot restricting member will not interfere with the support member and the platform portion can be switched over in posture between the riding posture and the folded posture. Further, when the pivot restricting member is switched in position to the pivot allowing posture with the platform portion being switched to the riding posture to be received and supported by the support member, the platform portion under the riding posture has its downward pivotal movement restricted by the support member and has also its upward pivotal movement restricted by the pivot restricting member. Hence, the upward and downward pivotal movements of the platform portion under the riding posture can be restricted and the platform portion can be maintained under the riding posture in a stable manner.

Further, e.g. in the case of an arrangement of providing the pivot restricting member on the side of the article storage shelf, there will arise a need for providing many pivot restricting members along the movement path so as to be capable of restricting the upward/downward movement of the platform portion at each one of the positions that can be assumed by the work platform in the course of its movement along the movement path. On the other hand, in the case of the above inventive arrangement, since the pivot restricting member is provided in the platform portion, only one or just a few pivot restricting member(s) is (are) needed. As a result, the construction of the article storage facility can be simplified.

According to the sixth characterizing feature of an article storage facility relating to the present invention, in any one of the first through fifth characterizing features described above, there are provided a lower guide rail provided in the floor surface of said movement path for guiding a lower portion of said stacker crane and an upper guide rail provided upwardly of said movement path for guiding an upper portion of said stacker crane, said upper guide rail acting also as said movement rail.

That is, as the upper guide rail for guiding the upper portion of the stacker crane along the movement path acts also as the movement rail, there is no need for separately providing a rail dedicated to guiding of the suspended portion along the movement path. Hence, the construction of the article storage facility can be simplified.

According to the seventh characterizing feature of an article storage facility relating to the present invention, in any one of the first through sixth characterizing features described above, said work platform includes an urging means for urging said platform portion from said riding posture toward said folded posture.

That is, as the platform portion is urged by the urging means from the riding posture toward the folded posture so that some of the load of the platform portion can be offset by the urging by the urging means, only a small force is needed for supporting the platform portion when this platform portion is to be switched in posture from the folded posture to the riding posture. Further, the force needed for lifting up the platform portion when this platform portion is to be switched over from the riding posture to the folded posture can be small as well. Therefore, the posture switchover operations of the platform portion to the riding posture or the folded posture are facilitated.

BRIEF DESCRIPTION OF THE DRAWINGS

FIG. 13 is a view showing a working condition maintaining means.

DETAILED DESCRIPTION OF THE INVENTION

Next, an embodiment of an article storage facility relating to the present invention will be explained with reference to the accompanying drawings.

Figure 1:
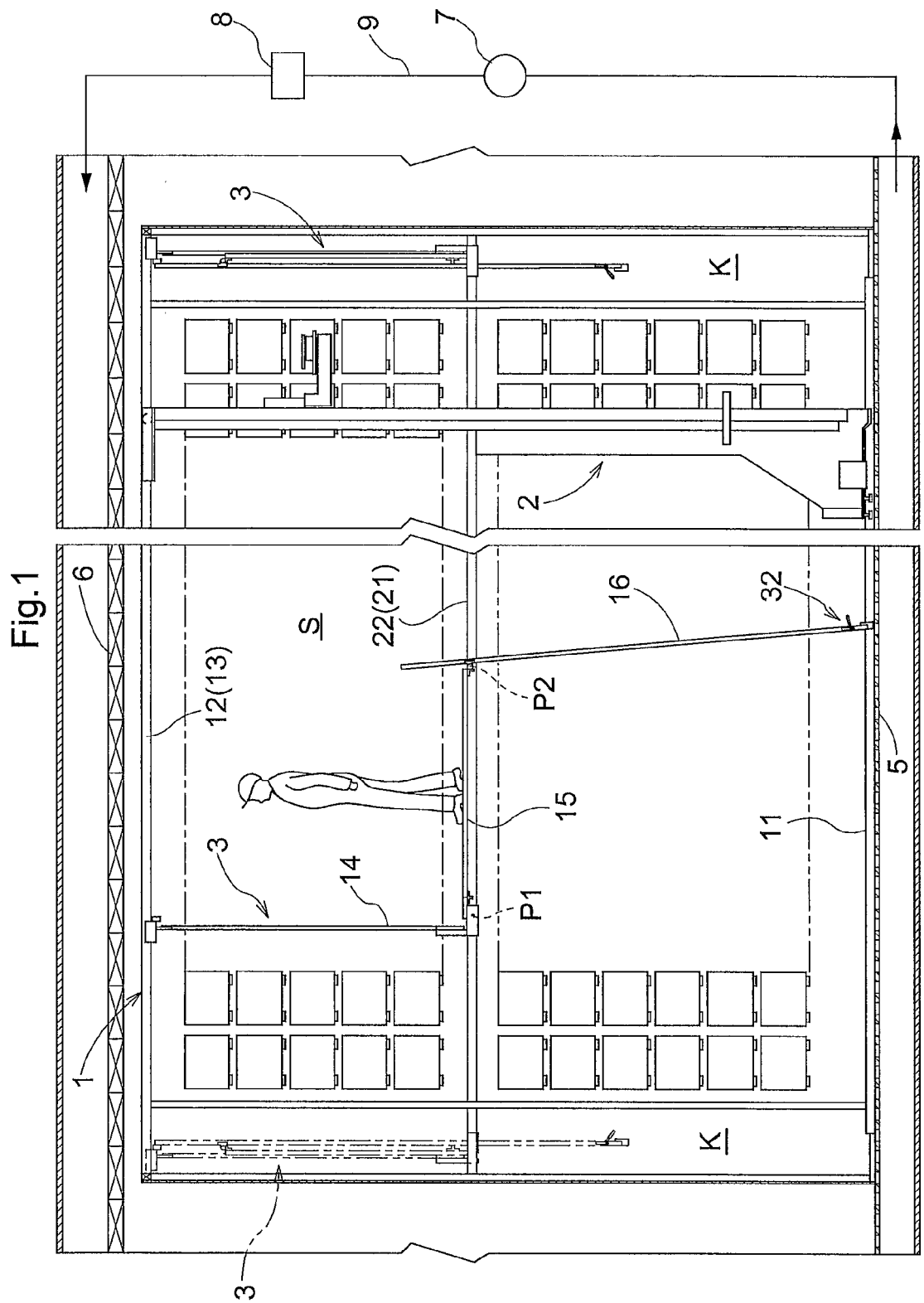
FIG. 1 is a side view of an article storage facility.
Figure 2:
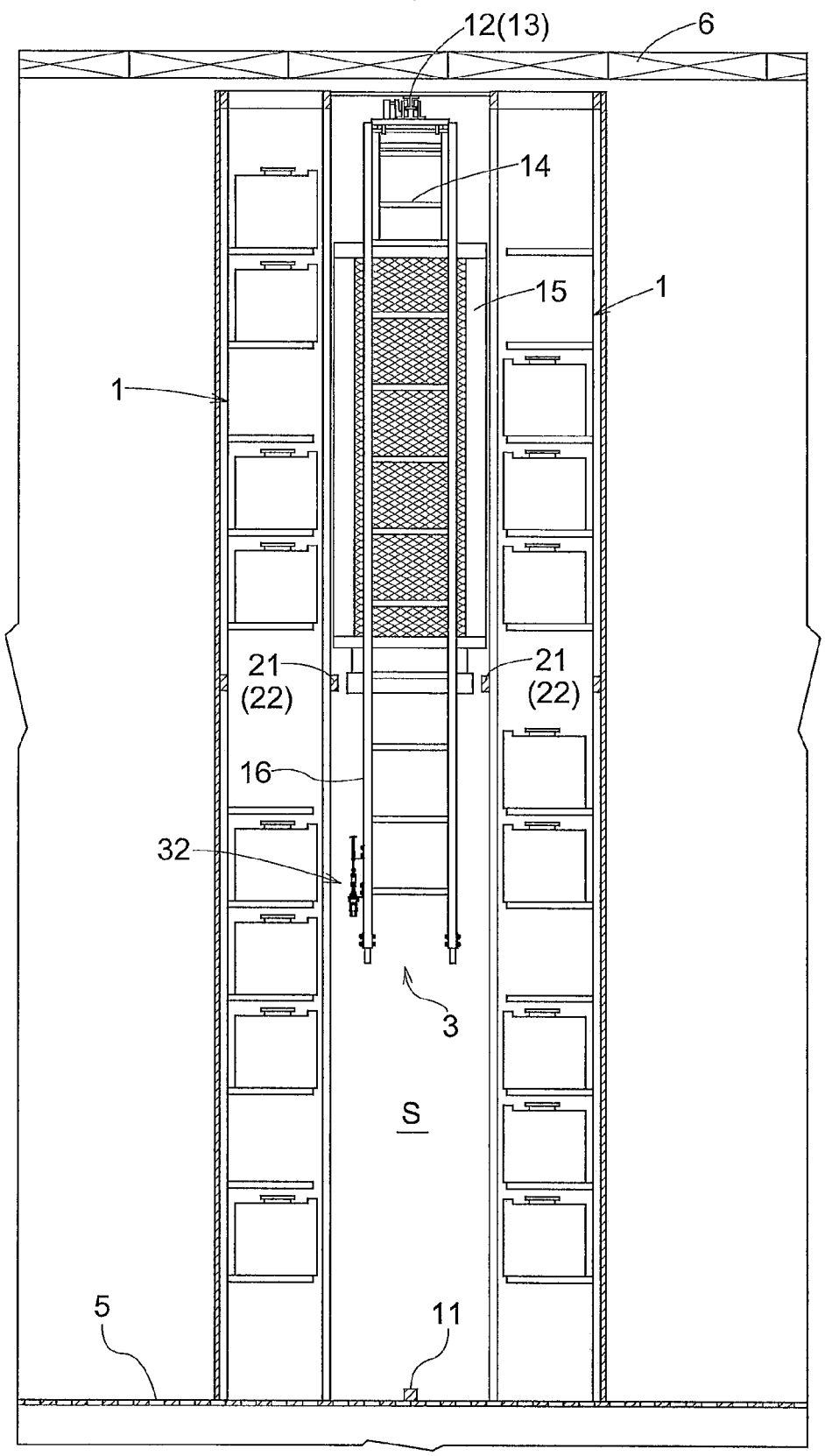
FIG. 2 is a front view of the article storage facility, illustrating a moving condition of a work platform.
Figure 3:
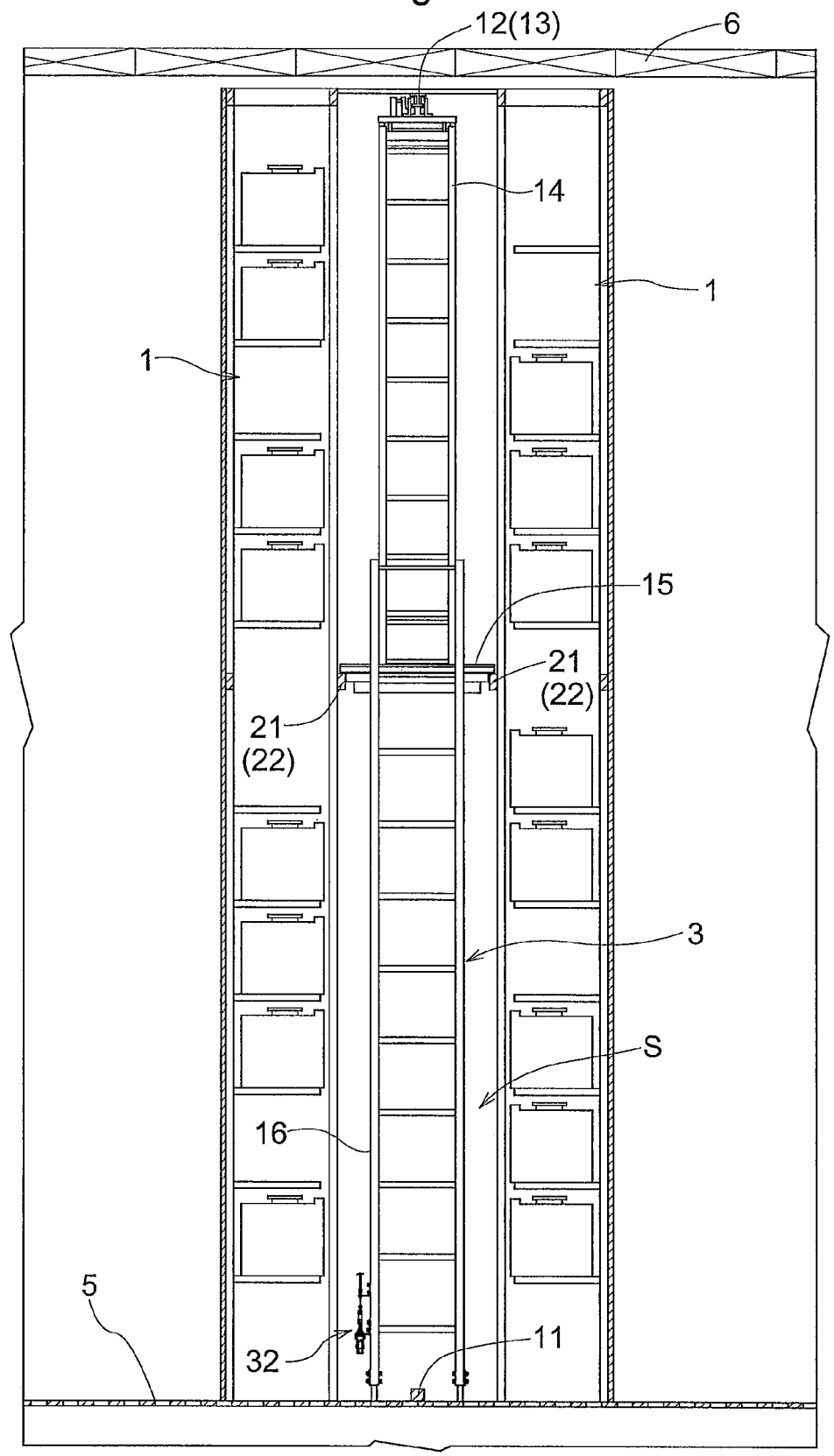
FIG. 3 is a front view of the article storage facility, illustrating a working condition of a work platform.

As shown in FIG. 1, the article storage facility includes a storage shelf 1 having storing sections for storing articles juxtaposed along the vertical direction and the shelf lateral width direction, a stacker crane 2 that travels on a floor surface of a movement path S formed forwardly of the storage shelf 1 along the longitudinal direction thereof, and a work platform 3 on which a worker can ride. As shown in FIG. 2 and FIG. 3, a pair of the storage shelves 1 are provided on opposed sides of the movement path S along the direction of its lateral width, so that the movement path S is formed between the pair of storage shelves 1. Incidentally, the article storage facility is configured for storing, as "articles", containers that respectively house partly-finished products of e.g. semiconductor devices, liquid crystal display devices, etc.

The article storage facility is installed inside a clean room from which dust has been removed. The clean room is configured as a down-flow type wherein a cleaned cleaning air is caused to flow from the ceiling toward the floor of the room to circulate downwardly. More particularly, as shown in FIG. 1, a space downwardly of a grating floor 5 constituting the floor portion and a space upwardly of an air filter 6 constituting the ceiling portion are communicated to each other through a blower fan 7 and a pre-filter 8, so that the air present inside the clean room is circulated while being cleaned by the pre-filter 8 and the air filter 6 and the resultant cleaned air is fed from the ceiling portion to the floor portion of the clean room.

Further, the article storage facility includes a lower guide rail 11 provided in the floor surface of the movement path S for guiding a lower portion of the stacker crane 2 and an upper guide rail 12 provided upwardly of the movement path S for guiding an upper portion of the stacker crane 2. Hence, the stacker crane 2 is configured to travel along the movement path S while being guided by the lower guide rail 11 and the upper guide rail 12.

Next, the work platform 3 will be explained.

Figure 4:
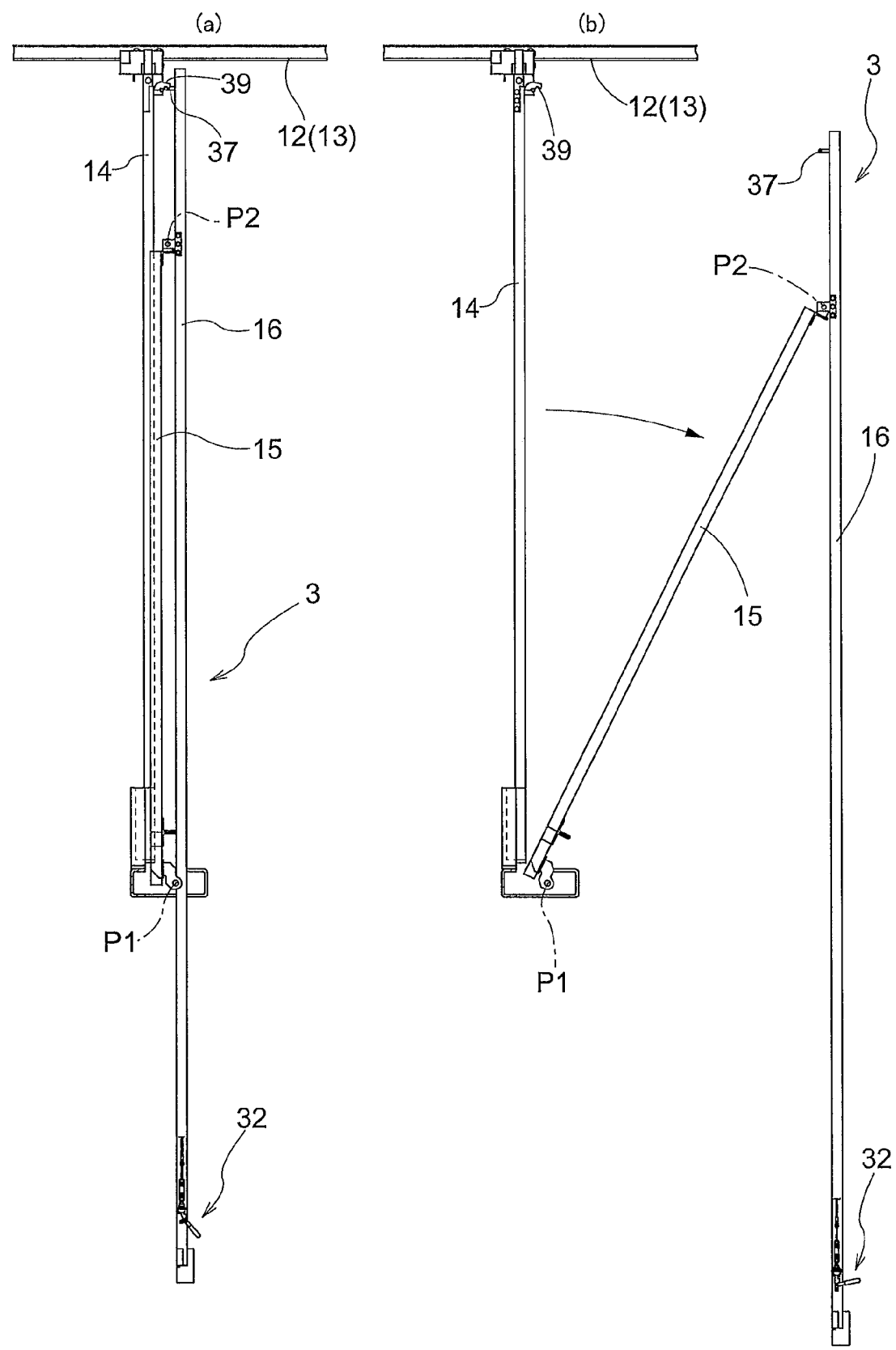
FIGS. 4(a)-(b) are side views of a work platform illustrating a moving condition and a condition in the course of its unfolding.

As shown in FIG. 1 and FIG. 4, the work platform 3 includes a suspended portion 14 suspended and supported above a floor surface, the suspended portion 14 being movable by the upper guide rail 12 along the longitudinal direction of the movement path S, and a platform portion 15 provided in the form of a plate on which the worker can ride, the platform portion 15 having a base end thereof connected to a lower end portion of the suspended portion 14 to be pivotable about a pivot axis P1 extending along the direction of lateral width of the movement path S. The work platform 3 further includes a stairway portion 16 connected to the platform portion 15 for allowing the worker to climb up/down the stairway portion from/to the floor surface. The stairway portion 16 is connected and supported to the leading end portion of the platform portion 15 with its base end portion pivotable about a second pivot axis P2 extending along the lateral width of the movement path S. Meanwhile, the terminal end along the longitudinal direction of the platform portion 15 connected and supported to the suspended portion 14 is referred to as the "base end portion", whereas the opposite terminal end is referred to as the "leading end portion", respectively. Further, the terminal end along the longitudinal direction of the stairway portion 16 connected and supported to the platform portion 15 is referred to as the "base end portion".

In the work platform 3, as described above, the suspended portion 14 is suspended and supported by the upper guide rail 12, and to this suspended portion 14, the platform portion 15 is connected and the stairway portion 16 is connected to the platform portion 15. Hence, the suspended portion 14, the platform portion 15 and the stairway portion 16 can be moved altogether along the longitudinal direction of the movement path S. Further, as the suspended portion 14 is suspended and supported by the upper guide rail 12 for guiding the upper portion of the stacker crane 2, this upper guide rail 12 acts also as a movement rail 13 for suspending and supporting the suspended portion 14 upwardly of the floor surface with allowing movement thereof along the movement path S. Incidentally, the work platform 3 has a narrower width than the lateral width of the movement path S (the distance between the pair of storage shelves 1).

With pivotal movements thereof about the first pivot axis P1, the platform portion 15 can selectively assume a riding posture (see FIG. 5) wherein the platform portion 15 extends along longitudinal direction of the movement path S so that the worker riding on this platform portion 15 can move along the longitudinal direction of the movement path S and a folded posture (see FIG. 4(a)) wherein the platform portion 15 is folded toward the suspended portion 14 to extend along the vertical direction. Also, with pivotal movements thereof about the second pivot axis P2, the stairway portion 16 can selectively assume a climbing posture (see FIG. 5) where the stairway portion 16 extends along the vertical direction with the platform portion 15 being switched to the riding posture and a non-climbing posture (see FIG. 4(a)) where the stairway portion 16 is folded toward the platform portion 15 to extend along the vertical direction, with the platform portion 15 being switched to the folded posture. Incidentally, the first pivot axis P1 corresponds to what is referred to as the "pivot axis" in the present invention.

Figure 5:
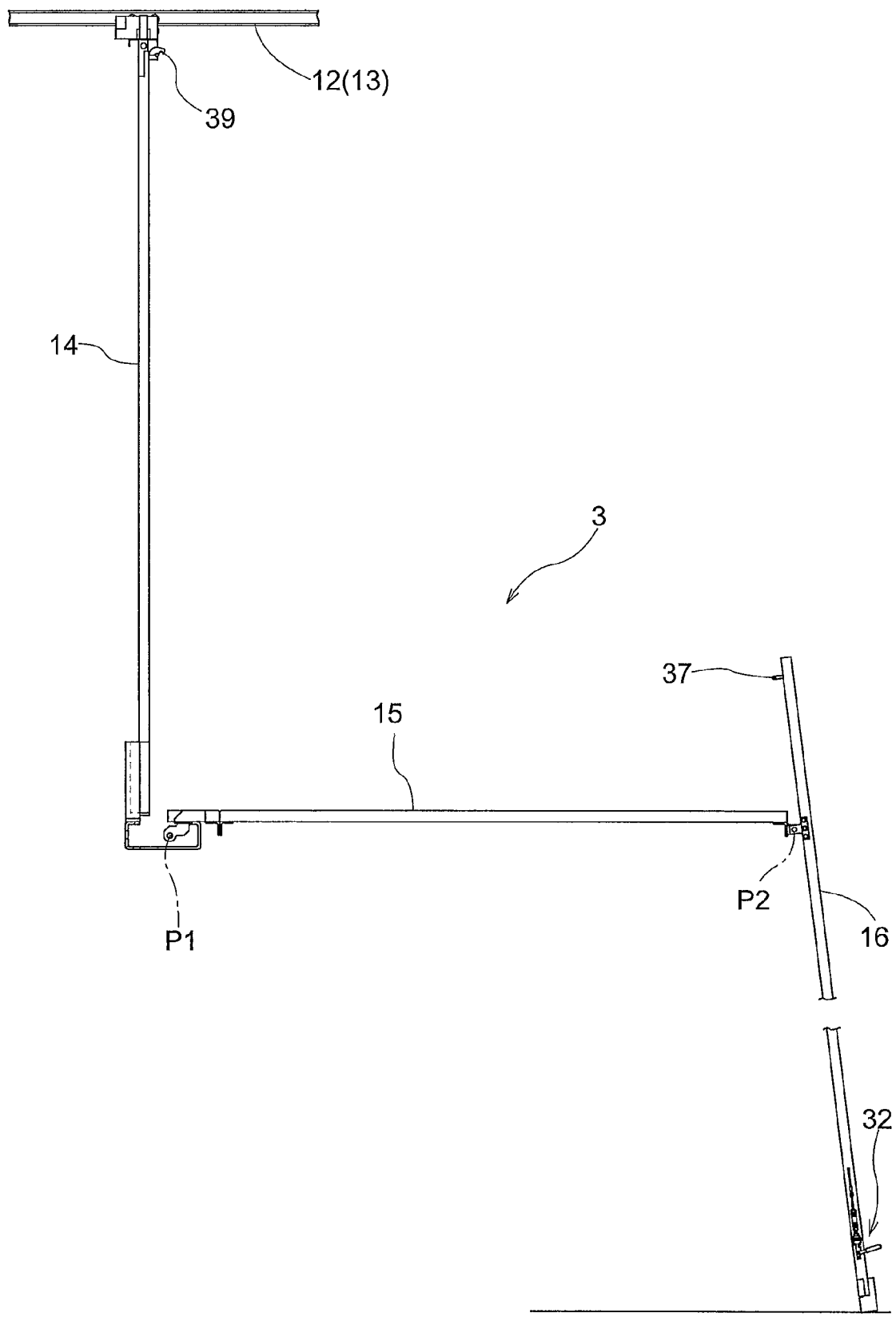
FIG. 5 is a side view of the work platform illustrating a working condition.

That is, with the work platform 3, as illustrated in FIG. 5, when the platform portion 15 is set to the riding posture and the stairway portion 16 is set to the climbing posture, the work platform 3 is switched to the working condition where the worker can climb onto the platform portion 15 with using the stairway portion 16. Also, with this work platform 3, as illustrated in FIG. 4(a), when the platform portion 15 is set to the folded posture and the stairway portion 16 is set to the non-climbing posture, the work platform 3 is switched to the moving condition where the work platform 3 can be moved along the longitudinal direction of the movement path S by a pushing or pulling operation thereof by the worker.

Further, as shown in FIG. 1, the work platform 3 is provided as a pair. And, under a normal operational condition where an article conveying operation is effected with traveling of the stacker crane 2, these paired work platforms 3 are to be stored under the moving conditions thereof at storage locations K provided at the opposed longitudinal ends of the movement path S relative to the stacker crane 2. And, when there arises a need for a work to be effected by a worker such as occurrence of collapse of articles stored in the storage shelf 1 or of articles being conveyed by the stacker crane 2, the work platform 3 stored at the storage location K is moved to the vicinity of the location where such work is required. Then, this work platform 3 is switched over to the working condition, so that the worker will ride on this work platform 3 to effect the required work.

Further, a support member 21 for receiving and supporting the platform portion 15 under its riding posture is provided at the vertical center portion of the storage shelf 1. In this embodiment, as this support member 21, an elongate member 22 formed elongate is provided in each one of the pair of storage shelves 1 along the longitudinal direction of the movement path S and extending horizontal to project into the movement path S. That is, when the work platform 3 is switched to the working condition, the opposed ends of the platform portion 15 along the lateral width direction thereof are received and supported by the elongate member 22, whereby the platform portion 15 is received and supported by the support member 21.

Next, the work platform 3 will be explained in details. As the pair of work platforms 3 have an identical construction, only one work platform will be described and explanation of the other work platform 3 will be omitted.

[Suspended Portion]

As shown in FIG. 3, the suspended portion 14 of the work platform 3 is provided in the form of a "ladder", consisting of a pair of left and right vertical rods and a plurality of lateral rods supported and connected between the pair of vertical rods. As the worker climbs up the suspended portion 14, the worker can climb to a position higher than the platform portion 15. Further, the suspended portion 14 has such a longitudinal length that the lower end thereof may be located at the same level as the support member 21 and the lateral width of the lower end has a narrower width than the lateral width distance between the pair of elongate members 22.

Figure 6:
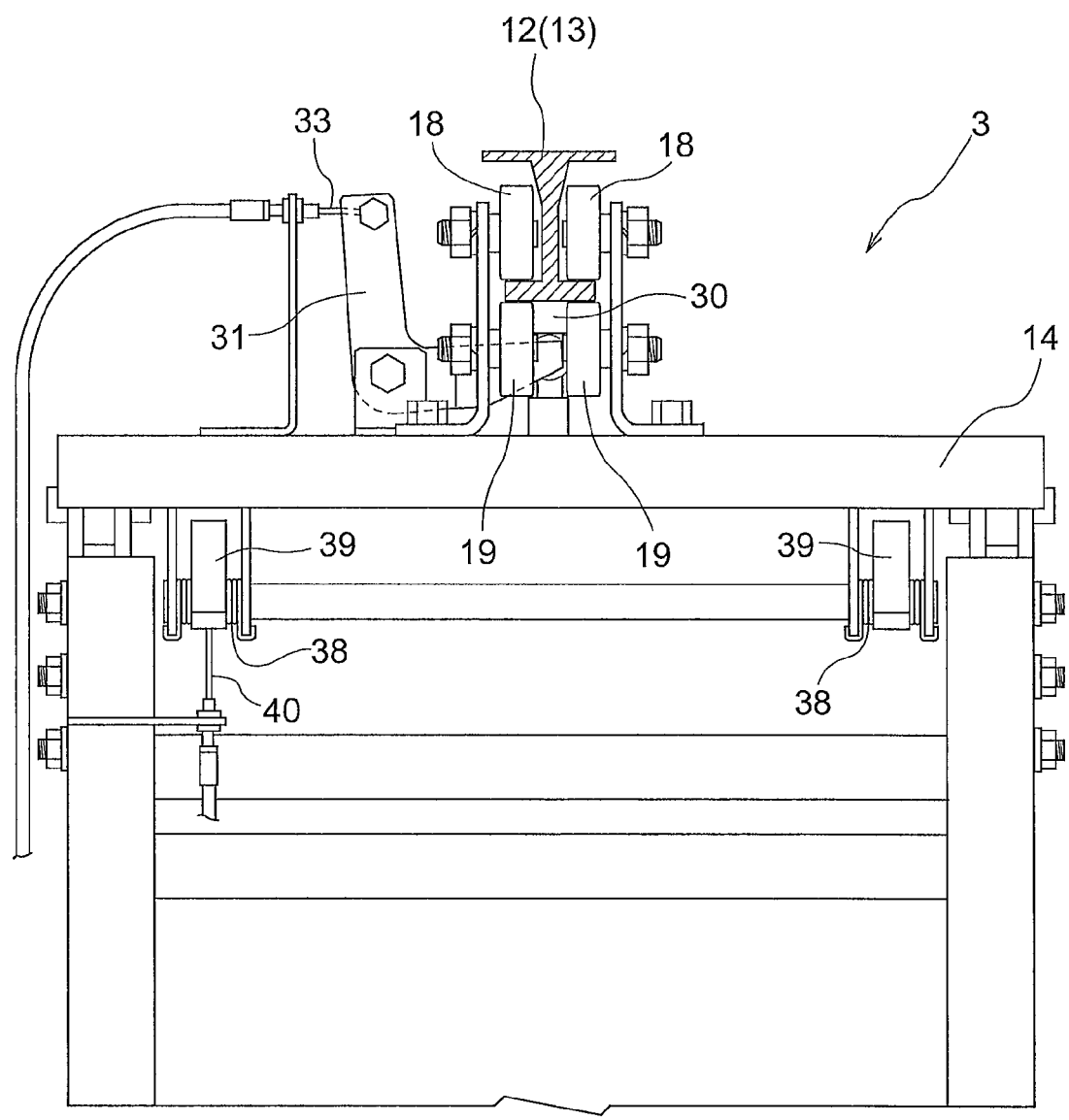
FIG. 6 is a front view showing an upper end of a suspended portion.
Figure 7:
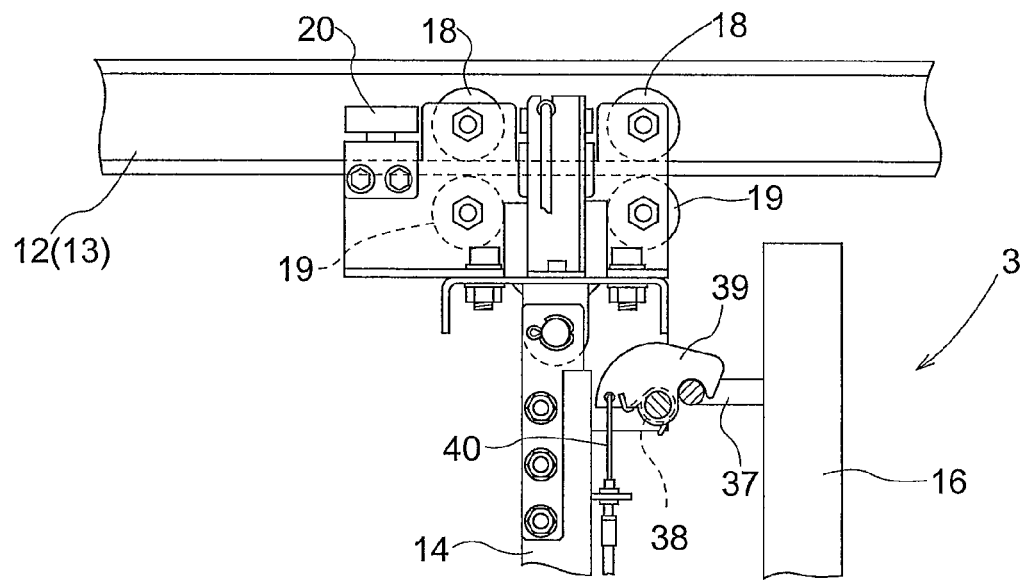
FIG. 7 is a side view showing the upper end of the suspended portion.

And, as shown in FIG. 6 and FIG. 7, at the upper end portion of the suspended portion 14, there are provided roller wheels 18 which can roll on the upper guide rail 12 as freely rotating about horizontal axes, lower restricting wheels 19 which come into contact with the lower face of the upper guide rail 12 for restricting floating displacement of the suspended portion 14 off the upper guide rail 12 and lateral restricting wheels 20 which come into contact with lateral faces of the upper guide rail 12 for restricting displacement of the suspended portion 14 along the lateral width direction relative to the upper guide rail 12. Then, the suspended portion 14 is suspended and supported to be movable along the upper guide rail 12 with the above-described functions of the roller wheels 18, the lower restricting wheels 19 and the lateral restricting wheels 20.

[Platform Portion]

As shown in FIG. 4, the platform portion 15, when assuming the folded posture, is overlapped with the suspended portion 14 to be located on the side where the stacker crane 2 is present. As the platform portion 15 is developed, i.e. unfolded, from this folded posture, toward the side where the stacker crane 2 is present, the posture is switched to the riding posture. Further, the platform portion 15 has a length which is about ⅓ of the height of the storage shelf 1 and which also corresponds to the total length of approximately four storage sections 4 juxtaposed along the longitudinal direction of the movement path S, whereby the length of the platform portion 15 is set as such a length that allows walking movement of the worker along the movement path S on the platform portion 15 under the riding posture. Further, the platform portion 15 has a width greater than the lateral width distance between the pair of elongate members 22.

Figure 12:
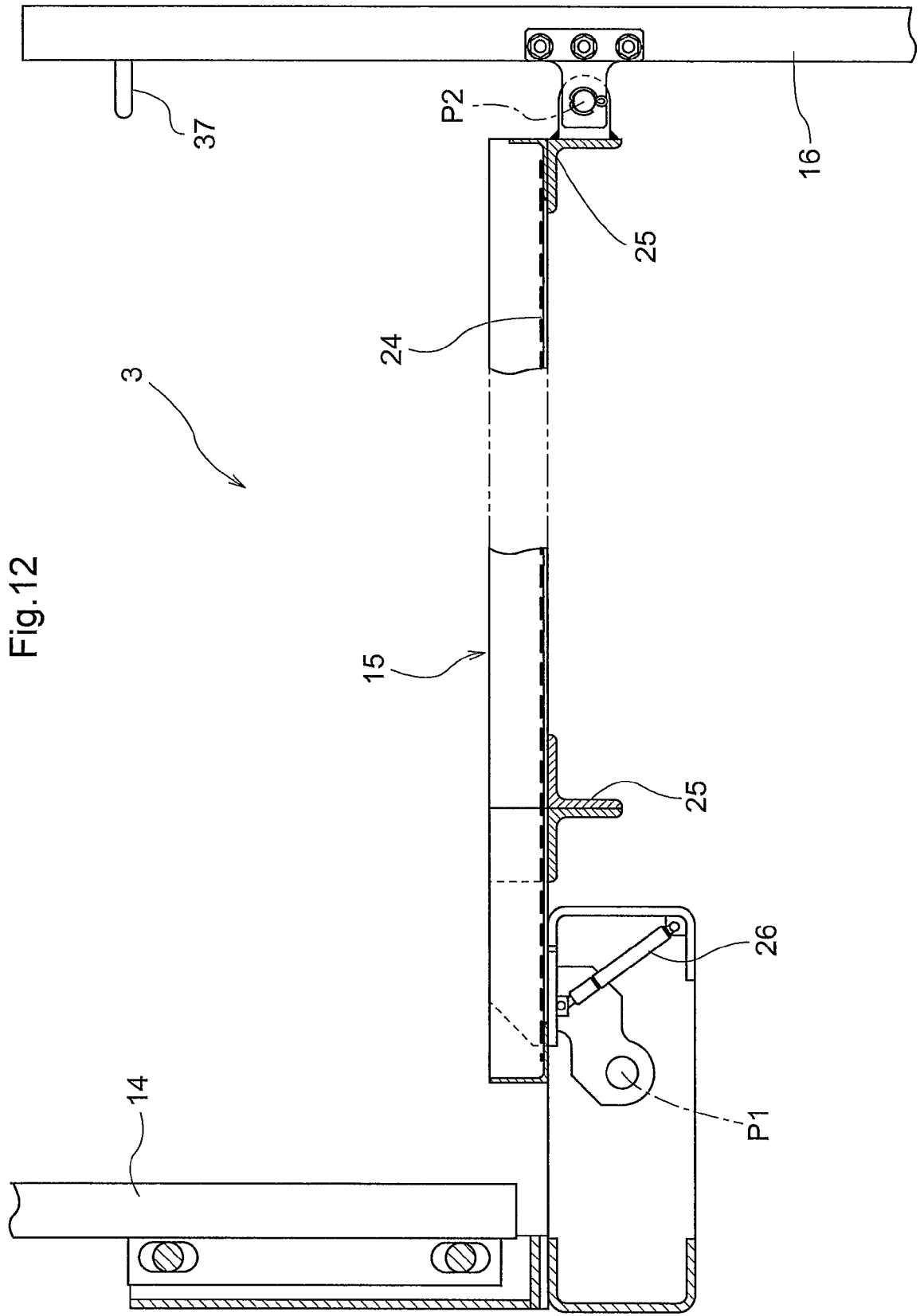
FIG. 12 is a view showing the urging means under a working condition.

And, as shown in FIG. 12 and FIG. 13(b), the platform portion 15 includes a riding portion 24 mounted and supported by the pair of elongate members 22 under the riding posture and a base portion 25 disposed between the pair of elongate members 22 under the riding posture. And, as the platform portion 15 is switched over to the riding posture, the riding portion 24 of the platform portion 15 under the riding posture can be mounted and supported by the pair of elongate members 22. And, with the platform portion 15 being mounted and supported in this manner, the base portion 25 restricts positional displacement of the platform portion 15 along the lateral width direction. Incidentally, the posture of the platform portion 15 under the riding posture is provided as a horizontal posture.

[Stairway Portion]

Under the non-climbing posture, the stairway portion 16, as shown in FIG. 4(a), is overlapped with the platform portion 15 to be located on the side of the presence of the stacker crane 2 relative to the platform portion 15, so that the stairway portion 16 is switched over in its posture from this non-climbing posture to the climbing posture, with obliquely downward unfolding thereof toward the side of the presence of the stacker crane 2 (FIG. 5). Further, when the stairway portion 16 assumes this climbing posture, the stairway portion 16 assumes an inclined posture with the leading end thereof being in contact with the floor surface and also with this leading end being on the side of the presence of the stacker crane 2. The base end portion of the stairway portion 16 is connected and supported to the platform portion 15 at a position distant from the base end toward the leading end side (floor surface side) so that it may project upward from the platform portion 15 under the climbing posture. The stairway portion 16 has its lateral width narrower than the distance between the elongate members 22 along the lateral width direction.

Further, the height of the stairway portion 16 under the non-climbing posture is set as a height accessible by the hand of a worker present on the floor surface. When the work platform 3 is switched to the moving condition, the worker will grip the leading end of the stairway portion 16 to push or pull this stairway portion 16, whereby the work platform 3 can be moved along the movement path S. Further, like the suspended portion 14, the stairway portion 16 is constructed in the form of a "ladder" including a pair of vertical rods and a plurality of lateral rods connected between the pair of vertical rods. By using this stairway portion 16, the worker can mount and dismount the platform portion 15.

[Urging Means]

Figure 11:
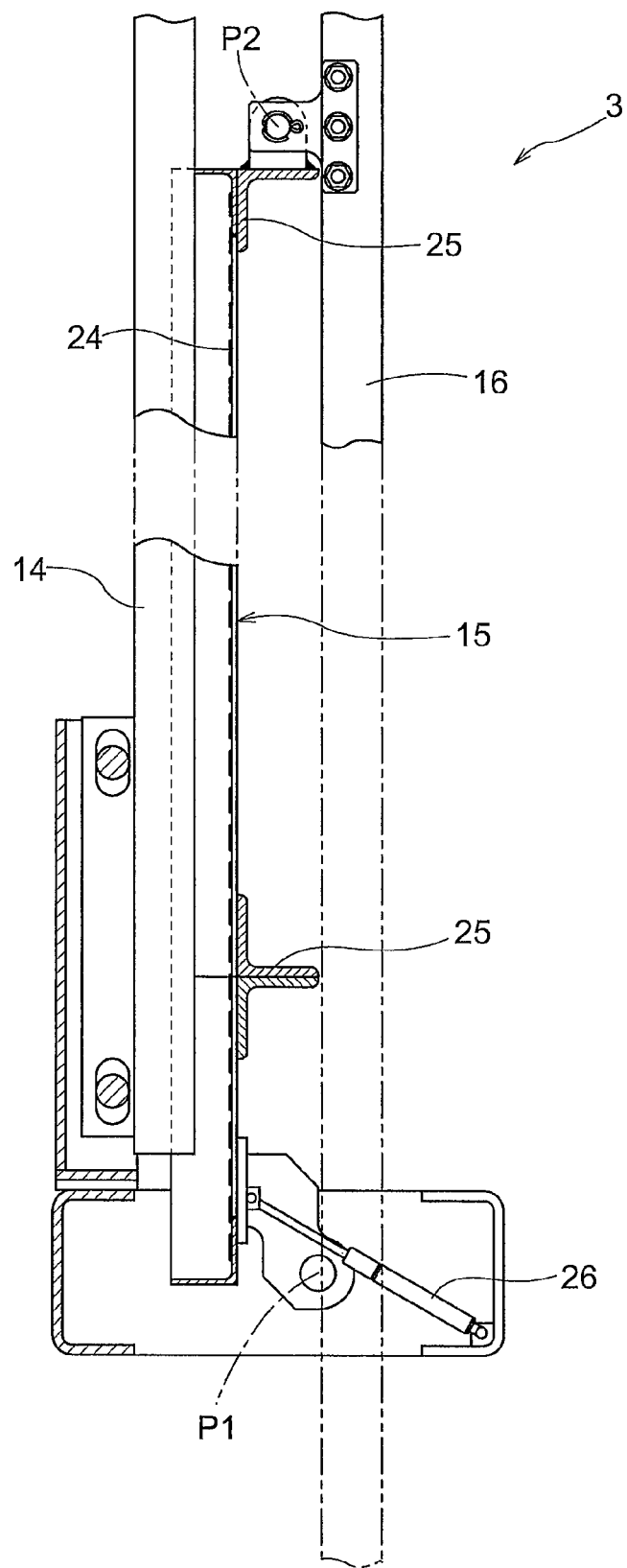
FIG. 11 is a view showing an urging means under a moving condition.

As shown in FIG. 11 and FIG. 12, the work platform 3 includes an urging means 26 provided as a gas-filled damper for urging the platform portion 15 from the riding posture toward the moving posture, thus assisting a switchover operation to the working condition or the moving condition. That is, when the platform portion 15 is switched in posture to the folded posture, the work platform 3 is maintained under the moving posture with the urging force of the urging means 26. And, when the work platform 3 is switched over from the moving condition to the working condition, the worker will switch over the posture of the platform portion 15 closer to the riding posture side than an intermediate posture (see FIG. 4(b)) between the folded posture and the riding posture, against the urging force of the urging means 26. Thereafter, the posture will be switched to the riding posture against the urging force of the urging means 26, with the weights of the platform portion 15 and the stairway portion 16. Also, when the work platform 3 is switched over from the working condition to the moving condition, the worker can switchover the posture of the platform portion 15 toward the folded posture side with a light operational force thanks to the urging force of the urging means 26. And, after the worker has switched the posture of the platform portion 15 from the intermediate posture toward the folded posture side, the posture will be changed to the folded posture with the urging force of the urging means 26.

The work platform 3 includes a movement preventing means 28 for preventing movement of the work platform 3, a moving condition maintaining means 36 for maintaining the work platform 3 under the moving condition, and a working condition maintaining means 42 for maintaining the work platform 3 under the working condition. Next, these components will be explained.

[Movement Preventing Means]

Figure 8:
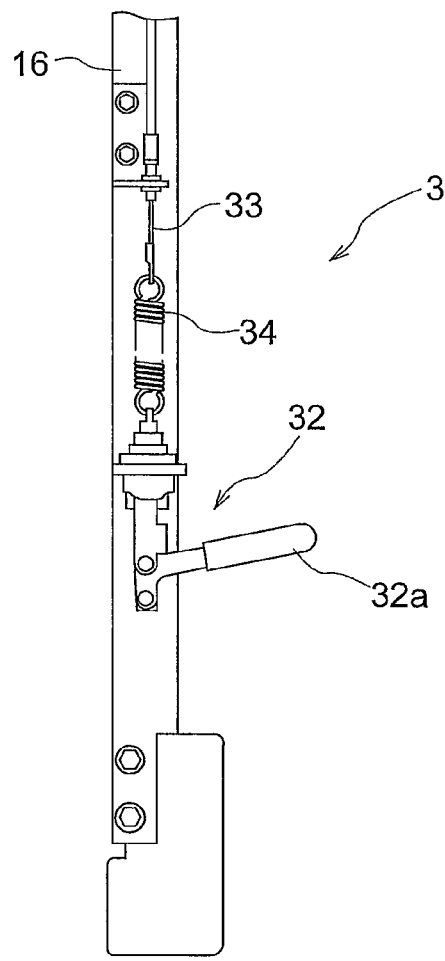
FIG. 8 is a side view showing a leading end of a stairway portion.
Figure 9:
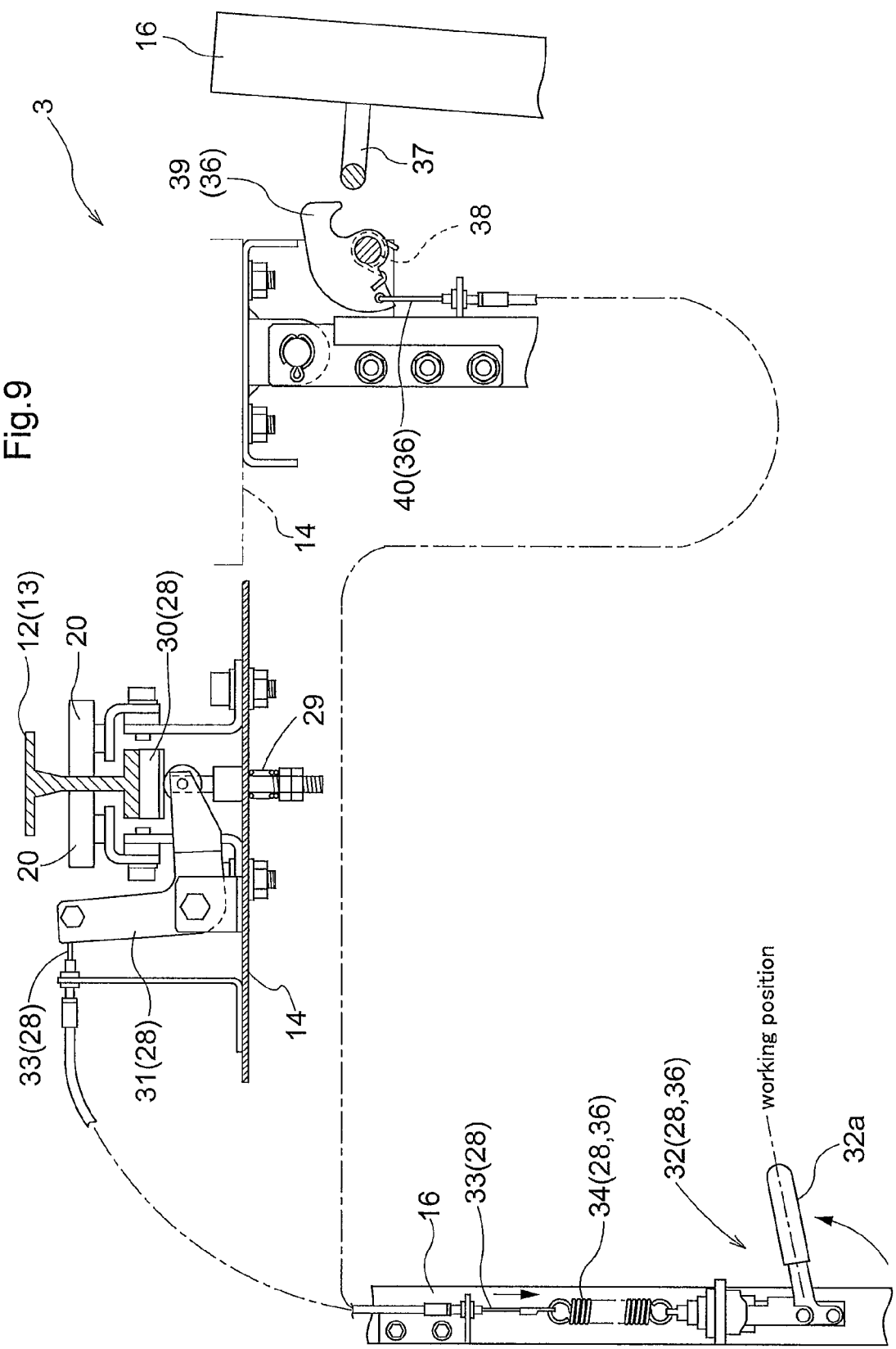
FIG. 9 is a view showing a movement preventing means and a moving condition maintaining means under a working condition.

As shown in FIG. 6, FIG. 8 and FIG. 9, the movement preventing means 28 includes a braking contact body 30 movable up/down between a position for coming into contact with a lower face of the upper guide rail 12 and a position downwardly away from the upper guide rail 12 and urged toward the distant position by a compression spring 29, a pivot operation type link operational tool 31 pivotable for lifting up/down the braking contact body 30, and a manual operational portion 32 having a pivot operation type hand lever 32a to be pivotally operated by a worker, and a first wire 33 which operably couples the link operational tool 31 and the manual operational portion 32. The braking contact body 30 and the linking operational tool 31 are provided at an upper end portion of the suspended portion 14, and the manual operational portion 32 is provided at a lower end of the stairway portion 16. Further, the first wire 33 is provided along the suspended portion 14, the platform portion 15 and the stairway portion 16, and a tension spring 34 is interposed between the first wire 33 and the manual operational portion 32.

Figure 10:
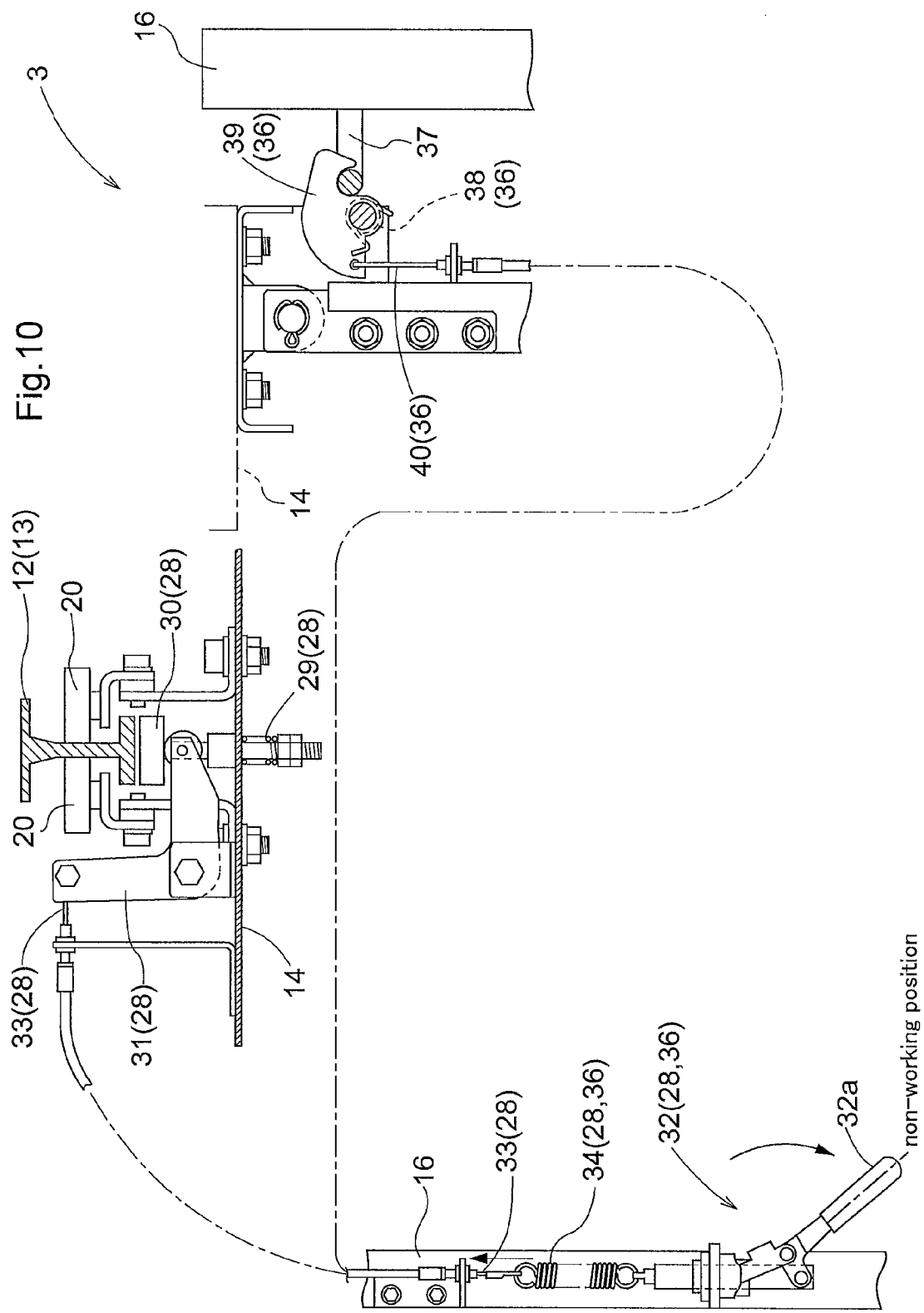
FIG. 10 is a view showing the movement preventing means and the moving condition maintaining means under a moving condition.

And, as shown in FIG. 9, when the hand lever 32a is pivotally operated to its working position, the first wire 33 is pulled to pivot the linking operational tool 31, whereby the braking contact body 30 is moved upward against the urging force of the compression spring 29 to come into contact with the upper guide rail 12. Under this condition, a movement of the work platform 3 is prevented by the contacting of the braking contact body 30 with the upper guide rail 12. Further, as illustrated in FIG. 10, when the hand lever 32a is pivotally operated to its non-working position, the pulling operation on the first wire 33 is released, whereby the braking contact body 30 will be moved downwards by the urging force of the compression spring 29, thus moving away from the upper guide rail 12. Under this condition, since the braking contact body 30 is out of contact with the upper guide rail 12, a movement of the work platform 3 is allowed. Further, the manual operational portion 32 includes a well-known dead point-riding over type clamp device, so that the manual operational portion 32 can be maintained in position at the working position or the non-working position, respectively.

[Moving Condition Maintaining Means]

The moving condition maintaining means 36 includes an engaging body 39 pivotable between an engaging posture where the engaging body 39 engages with an engaged body 37 provided at the base end portion of the stairway portion 16 and a non-engaging posture where the engaging body 39 is released from its engagement with the engaged body 37 and urged toward the engaging posture by means of a helical spring 38, the manual operational portion 32 and a second wire 40 for operably coupling the engaging body 39 with the manual operational portion 32. The engaging body 39 is provided at an upper end portion of the suspended portion 14 and the second wire 40 is connected to the first wire 33.

And, as shown in FIG. 9, under the condition of the work platform 3 being switched to the moving condition, when the hand lever 32a is pivotally operated to the working position, the second wire 40 is pulled so that the engaging body 39 is pivoted toward its non-engaging posture side against the urging force of the helical spring 38, thus releasing the engagement of the engaging body 39 with the engaged body 37. Under this condition, the work platform 3 can be switched over to the working condition, with unfolding of the platform portion 15 or the stairway portion 16. Further, as shown in FIG. 10, under the condition of the work platform 3 being switched to the moving condition, when the hand lever 32a is pivotally operated to the non-working position, the pulling operation on the second wire 40 is released, whereby the engaging body 39 is pivoted toward its engaging posture side by the urging force of the helical spring 38 and the engaging body 39 comes into engagement with the engaged body 37. Under this condition, the platform portion 15 or the stairway portion 16 cannot be unfolded (developed), so that the work platform 3 cannot be switched over to the working condition. Incidentally, under the condition of the engaging body 39 assuming the engaging posture with switchover of the work platform 3 to the working condition and the hand lever 32a being pivoted to the non-working position, if the working platform 3 is switched over to the moving condition, in the course of this switchover, the engaged body 37 will come into contact with the engaging body 39 and the engaging body 39 will be pivoted away from the path of the movement of the engaged body 37, and upon completion of switchover of the work platform 3 to the moving condition, the engaging body 39 will come into engagement with the engaged body 37.

[Working Condition Maintaining Means]

As the working condition maintaining means 42, at each of the opposed lateral width ends of the platform portion 15, there are provided a plurality of pivot restricting members 43 along the longitudinal direction. Each one of these plurality of pivot restricting members 43 is provided in the lower face of the platform portion 15 to be pivotable about a vertical axis. As the pivot restricting member 43 is rotatably operated with the platform portion 15 being switched to the riding posture, the pivot restricting member 43 can change its position between a pivot restricting position (the position denoted with solid line in FIG. 13(*b*)) located downwardly of the support member 21 and a pivot allowing position (the position denoted with virtual line in FIG. 13(*b*)) retracted along the lateral width direction away from under the support member 21.

And, under the condition of the work platform 3 being switched to the working condition, when the respective pivot restricting members 43 are changed in position to the pivot restricting position, the plurality of pivot restricting members 43 provided at one end of the platform portion 15 along the lateral width direction will come into contact with the lower face of one elongate member 22, whereas the plurality of pivot restricting members 43 provided at the other end of the platform portion 15 along the lateral width direction will come into contact with the lower face of the other elongate member 22. With these, the pivotal movement of the platform portion 15 from the riding posture toward the folded posture can be restricted. Further, under the condition of the work platform 3 being switched to the working condition, if the pivot restricting members 43 are changed in position to the pivot allowing position, the plurality of pivot restricting members 43 will not come into contact with the pair of elongate members 22 of the support member 21, so that the platform portion 15 is now allowed to be switched over in posture from the riding posture to the folded posture.

Further, the pivot restricting members 43 are located between the pair of elongate members 22 under the condition of the work platform 3 being switched to the working condition and will approach the corresponding elongate members 22 when changed in position from the pivot allowing position to the pivot restricting position. And, under the condition of the pivot restricting member 43 being changed in position to the pivot restricting position, this pivot restricting member 43 comes into contact with the lateral face of the elongate member 22 on the side of the movement path S, thus restricting movement of the platform portion 15 along the lateral width direction. Also, the platform portion 15 includes restricting bodies 44 which are located on the outer side in the lateral width direction of the pair of elongate members 22 under the condition of the work platform 3 being switched to the working condition. Hence, the movement of the platform portion 15 along the lateral width direction is restricted also by this restricting body 44 coming into contact with the opposite lateral face of the pair of elongate members 22 away from the movement path S side. Incidentally, although illustration and detailed explanation thereof are omitted, there is provided a storage maintaining means for maintaining the work platform at its storage location K by e.g. fixing the work platform 3 to a component present adjacent thereto such as a storage shelf 1, when the work platform 3 is stored at this storage location K.

When there arises a need for a work by a worker using the work platform 3, the retention of the work platform 3 stored at the storage location K by the storage maintaining means is released and then the worker will push or pull the work platform 3 to the vicinity of the place of work. Thereafter, the worker will pivotally operate the hand lever 32*a* to its working position, thus preventing movement of the work platform 3 and also allowing the work platform 3 to be switched over to the working condition. Next, the worker will pull the stairway portion 16 obliquely downwards, thereby to switch the work platform 3 to the working condition. Under this condition, the worker will climb up the stairway portion 16 to ride onto the platform portion 15. Then, after changing the pivot restricting members 43 in position to the pivot restricting position, the worker will effect the work on the platform portion 15 while moving along the movement path S. Further, if needed, the worker will climb up the suspended portion 14 to effect a work at an even higher position. Incidentally, the work will be effected with using the work platform 3 located on the side of the work site relative to the site where the stacker crane 2 is stopped, of the pair of work platforms 3.

After completion of the work, the worker will change the position of the pivot restricting members 43 to the pivot allowing position and then will climb down onto the floor surface and will push the stairway portion 16 obliquely upwards, thus switching the work platform 3 to the moving condition. Next, the worker will pivotally operate the hand lever 32*a* to the non-working position, thus allowing movement of the work platform 3 and also preventing the work platform 3 from being switched over to the working condition. Then, the worker will push or pull the work platform 3 to move it to the storage position and then cause the work platform 3 to be retained at the storage position by the storage maintaining means.

Other Embodiments (1) In the foregoing embodiment, the work platform 3 includes its stairway portion 16 which is connected to the platform portion 15. Instead, in the work platform 3, its stairway portion 16 may be provided separately from the platform portion 15. That is, in the work platform 3, the suspended portion 14 and the platform portion 15 may be moved together to the vicinity of the site of work and separately of this, the stairway portion 16 may be moved to the vicinity of the site of work. In this case, the stairway portion 16 may be configured to be detachably attached to the platform portion 15 under the rising posture. Alternatively, the stairway portion 16 may be configured to be capable of standing by itself on the floor surface. Incidentally, in case the stairway portion 16 being provided as being connected to the platform portion 15, the leading end of the stairway portion 16 under the climbing posture may be distant upwardly from the floor surface, or the stairway portion 16 may assume a perpendicular posture.

(2) In the foregoing embodiment, the work platform 3 was configured as the triple-folding construction consisting of the suspended portion 14, the platform portion 15 and the stairway portion 16. Instead, it is possible to configure the work platform 3 to be folded four or more times, by rendering the base end side portion and the leading end side portion of the platform portion 15 foldable also.

(3) In the foregoing embodiment, as the support member 21, there was provided the elongate member 22 formed elongate extending along the longitudinal direction of the movement path S. Instead, as the support member 21, there may be provided a plurality of support bodies juxtaposed along the longitudinal direction of the movement path S. In this case, the platform portion 15 under the riding posture will be received and supported by the plurality of support bodies juxtaposed along the longitudinal direction. Also, in case there is no need for supporting the platform portion 15 under the riding posture by the support member 21, the support member 21 can be omitted at all.

(4) In the foregoing embodiment, the pivot restricting member 43 was configured to be changeable in position between the pivot restricting position and the pivot allowing position with a rotational operation thereof about a vertical axis. Alternatively, the pivot restricting member 43 may be configured to be changeable in position between the pivot restricting position and the pivot allowing position, with a sliding movement thereof along the lateral width direction. Further alternatively, the pivot restricting member 43 may be configured to couple the platform portion 15 to the support member 21 with a bolt or the like. Incidentally, in case there is no need for restricting the upward pivotal movement of the platform portion 15, the pivot restricting member 43 may be omitted at all.

(5) In the forgoing embodiment, the upper guide rail 12 for guiding an upper portion of the stacker crane 2 acted also as the movement rail 13 for suspending and supporting the suspended portion 14 while allowing movement thereof. Instead, the movement rail 13 may be provided separately of the upper guide rail 12, so that the upper guide rail 12 does not act as the movement rail 13.

(6) In the foregoing embodiment, a damper was provided as the urging means 26. Instead, as this urging means 26, any other means such as a helical spring, may be provided. Further, in case there is no need for urging the platform portion 15 from the riding posture side to the folded posture side, the urging means 26 may be omitted at all.

(7) In the foregoing embodiment, the work platform 3 was configured such that under the moving condition, the suspended portion 14, the platform portion 15 and the stairway portion 16 are folded one on another on the side of the presence of the stacker crane 2 and the platform 3 is switched over to the working condition by unfolding the folded assembly toward the side of the presence of the stacker crane 2. Alternatively, the work platform 3 may be configured such that under the moving condition, the suspended portion 14, the platform portion 15 and the stairway portion 16 are folded one on another on the side of the absence of the stacker crane 2 and the platform 3 is switched over to the working condition by unfolding the folded assembly toward the side of the absence of the stacker crane 2. With this configuration of the work platform 3, it is possible to dispose the suspended portion 14 closer to the stacker crane 2 than the stairway portion 16.

(8) In the foregoing embodiment, a pair of work platforms 3 were provided and these paired work platforms 3 were disposed at the opposed sides of the movement path S along the longitudinal direction relative to the stacker crane 2. Instead, only one work platform 3 can be provided and this work platform 3 can be provided on one side of the longitudinal direction of the movement path S relative to the stacker crane 2.

INDUSTRIAL APPLICABILITY

The present invention can be favorably applied to an article storage facility including a storage shelf having storing sections for storing articles juxtaposed along the vertical direction and the shelf lateral width direction, a stacker crane that travels on a floor surface of a movement path formed forwardly of the storage shelf along the longitudinal direction thereof, and a work platform on which a worker can ride.

DESCRIPTION OF REFERENCE MARKS/NUMERALS 1 storage shelf
2 stacker crane
3 work platform
11 lower guide rail
12 upper guide rail
13 movement rail
14 suspended portion
15 platform portion
16 stairway portion
21 support member
22 elongate member
26 urging means
43 pivot restricting member
P1 pivot axis
P2 second pivot axis
S movement path

The invention claimed is:

1. An article storage facility comprising:
    a plurality of storage shelves having storing sections for storing articles juxtaposed along a vertical direction and a shelf lateral width direction, the plurality of storage shelves, each provided with a support member;
    a stacker crane that travels on a floor surface of a movement path formed forwardly of the plurality of storage shelves along the longitudinal direction thereof; and
    a work platform on which a worker can ride;
    wherein said work platform includes a suspended portion that is vertically suspended and supported above the floor surface, the suspended portion being movable by a movement rail provided along the longitudinal direction of the movement path, and includes a platform portion on which the worker can ride, the platform portion having a base end thereof connected to a lower end portion of the suspended portion to be pivotable about a pivot axis extending along the direction of lateral width of the movement path; and
    with pivotal movements thereof about the pivot axis, the platform portion can selectively assume a horizontal riding posture wherein the platform portion extends horizontal along the longitudinal direction of the movement path so that the worker riding on this platform portion can move along the longitudinal direction of the movement path and a folded posture wherein the platform portion is folded toward the suspended portion to extend along the vertical direction and
    said support member receiving and supporting said platform portion when said platform portion extends horizontal along the longitudinal direction of the movement path in the horizontal riding posture, and said support member comprising an elongate member provided horizontal on said each of the plurality of storage shelves along the longitudinal direction of the movement path and projecting into the movement path to vertically support said platform portion from below when said platform portion is in the horizontal riding posture.

2. The article storage facility according to claim 1, wherein said work platform includes a stairway portion connected to said platform portion for allowing the worker to climb up and down the stairway portion from and to the floor surface;
    wherein said stairway portion is connected and supported to said platform portion with its base end portion pivotable about a second pivot axis extending along a lateral width of said movement path; and
    wherein, with pivotal movements thereof about said second pivot axis, said stairway portion can selectively assume a climbing posture where the stairway portion extends along the vertical direction with the platform portion being switched to said horizontal riding posture and a non-climbing posture where the stairway portion is folded toward the platform portion to extend along the vertical direction, with the platform portion being switched to said folded posture.

3. The article storage facility according to claim 1, wherein the plurality of storage shelves includes a pair of said storage shelves disposed on opposed lateral width sides of said movement path;
wherein said elongate member is provided for each of the pair of storage shelves.

4. The article storage facility according to claim 1, wherein said platform portion includes a pivot restricting member for restricting the upward pivotal movement of said platform portion, said pivot restricting member being switchable in position between a pivot restricting position where said pivot restricting member is located downwardly of said elongate member with said platform portion being switched to the horizontal riding posture, thereby to restrict a pivotal movement of said platform portion from said horizontal riding posture to said folded posture and a pivot allowing position where said pivot restricting member is retracted away from the position downwardly of the elongate member in the lateral width direction of the movement path with said platform portion being switched to said horizontal riding posture, thereby to allow the pivotal movement of said platform portion from said horizontal riding posture to said folded posture, and
wherein the pivot restricting member has a surface facing a lower face of the elongate member when switched to the pivot restricting position.

5. The article storage facility according to claim 4, wherein the pivot restricting member is provided in the lower face of the platform portion to be pivotable about a vertical axis to change its position between the pivot restricting position and the pivot allowing position.

6. The article storage facility according to claim 4, wherein the pivot restricting member has a restricting surface facing a lateral face of the elongate member adjacent to the movement path when switched to the pivot restricting position for restricting movement of the platform portion along the lateral width direction of the movement path.

7. The article storage facility according to claim 1, wherein there are provided a lower guide rail provided in the floor surface of said movement path for guiding a lower portion of said stacker crane and said movement rail guides an upper portion of the stacker crane.

8. The article storage facility according to claim 1, wherein said work platform includes an urging means for urging said platform portion from said horizontal riding posture toward said folded posture.

9. The article storage facility according to claim 1, wherein the elongate member is provided at least in a central part of the plurality of storage shelves in the longitudinal direction of the movement path.

10. The article storage facility according to claim 1, wherein the platform portion includes a restricting element located on an outer side of the elongate member away from the movement path when switched to the horizontal riding posture, and
wherein the restricting element has a restricting surface facing a lateral face of the elongate member away from the movement path with the platform portion being switched to the horizontal riding posture for restricting movement of the platform portion along the lateral width direction of the movement path.

11. An article storage facility comprising:
a storage shelf having storing sections for storing articles juxtaposed along a vertical direction and a shelf lateral width direction;
a stacker crane that travels on a floor surface of a movement path formed forwardly of the storage shelf along the longitudinal direction thereof; and
a work platform on which a worker can ride;
wherein:
said work platform includes a suspended portion suspended and supported above the floor surface, the suspended portion being movable by a movement rail provided upwardly of the movement path along the longitudinal direction of the movement path, and a platform portion on which the worker can ride, the platform portion having a base end thereof connected to a lower end portion of the suspended portion to be pivotable about a pivot axis extending along the direction of lateral width of the movement path;
with pivotal movements thereof about the pivot axis, the platform portion can selectively assume a riding posture wherein the platform portion extends along the longitudinal direction of the movement path so that the worker riding on this platform portion can move along the longitudinal direction of the movement path and a folded posture wherein the platform portion is folded toward the suspended portion to extend along the vertical direction and said storage shelf includes a support member for receiving and supporting said platform portion under its riding posture,
the work platform comprises:
a movement prevention part;
a posture change prevention part; and
an operatively connecting mechanism that interlockingly connects the movement prevention part and the posture change prevention part,
the movement prevention part switches a state of the suspended portion between a movement prevention state in which a movement of the suspended portion along a longitudinal direction of the movement path is prevented and a movement allowance state in which the movement of the suspended portion along the longitudinal direction of the movement path is allowed,
the posture change prevention part switches a state of the posture change of the platform portion between a posture change prevention state in which a posture change of the platform portion from the folded posture to the riding posture is prevented and a posture change allowance state in which the posture change of the platform portion from the folded posture to the riding posture is allowed, and
the operatively connecting mechanism interlocks a switching of the movement prevention part from the movement allowance state to the movement prevention state with a switching of the posture change prevention part from the posture change prevention state to the posture change allowance state, and interlocks a switching of the movement prevention part from the movement prevention state to the movement allowance state with a switching of the posture change prevention part from the posture change allowance state to the posture change prevention state.

* * * * *